US012812274B2

(12) United States Patent
Kato

(10) Patent No.: US 12,812,274 B2
(45) Date of Patent: Nov. 24, 2026

(54) COMMUNICATION APPARATUS, COMMUNICATION SYSTEM, AND COMMUNICATION METHOD

(71) Applicant: NEC Corporation, Tokyo (JP)

(72) Inventor: Takeshi Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 272 days.

(21) Appl. No.: 18/812,075

(22) Filed: Aug. 22, 2024

(65) Prior Publication Data

US 2025/0080883 A1 Mar. 6, 2025

(30) Foreign Application Priority Data

Aug. 31, 2023 (JP) ................................ 2023-141241

(51) Int. Cl.
*H04Q 11/00* (2006.01)

(52) U.S. Cl.
CPC . *H04Q 11/0066* (2013.01); *H04Q 2011/0081* (2013.01); *H04Q 2213/11* (2013.01)

(58) Field of Classification Search
CPC ....... H04Q 11/0066; H04Q 2011/0081; H04Q 2213/11
USPC ............................................................ 398/2
See application file for complete search history.

(56) References Cited

U.S. PATENT DOCUMENTS 9,836,063 B1 * 12/2017 Bonawitz .................. B64B 1/40
11,576,058 B2 * 2/2023 Ananth ............. H04B 7/18504
2011/0299398 A1 * 12/2011 Watanabe .............. H04L 45/24 370/236
2018/0338290 A1 * 11/2018 Tashiro .................... F24F 11/89

FOREIGN PATENT DOCUMENTS

JP 2018-011289 A 1/2018
WO 2021/156918 A1 8/2021
WO 2022/185490 A1 9/2022

* cited by examiner

*Primary Examiner* — Dalzid E Singh
(74) *Attorney, Agent, or Firm* — Sughrue Mion, PLLC

(57) ABSTRACT

To provide a communication apparatus capable of withstanding a short-time path failure while reducing network load. The communication apparatus included in communication apparatuses capable of forming a mesh free space optical communication network, includes: a communication section that transmits and receives packets each including (i) transmission information from a terminal, and (ii) determination information indicating a transmission source communication apparatus included in the communication apparatuses and connected to the terminal, and a transmission sequence; and a relay section that uses the determination information of a received packet and the determination information of a packet received in advance from at least one communication apparatus included in the communication apparatuses, to determine whether or not to relay the received packet to at least one communication apparatus in the communication apparatuses. The communication section transmits the received packet determined to be relayed by the relay section to the at least one communication apparatus.

15 Claims, 6 Drawing Sheets

FIG. 5

| TRANSMISSION SOURCE APPARATUS ID | SEQUENCE NUMBER | PAYLOAD |
|---|---|---|

FIG. 6

DB

| TRANSMISSION SOURCE APPARATUS ID | SEQUENCE NUMBER |
|---|---|
| A | 99 ⇒ 100 |
| C | 150 |
| D | 200 |

COMMUNICATION APPARATUS, COMMUNICATION SYSTEM, AND COMMUNICATION METHOD

This Nonprovisional application claims priority under 35 U.S.C. § 119 on Patent Application No. 2023-141241 filed in Japan on Aug. 31, 2023, the entire contents of which are hereby incorporated by reference.

TECHNICAL FIELD

The present disclosure relates to communication apparatuses, communication systems, and communication methods.

BACKGROUND ART

As a technique for making a path of information redundant, connecting each of transmitters to receivers through a network, a path redundancy system disclosed in Patent Literature 1, for example, is known. In the path redundancy system of Patent Literature 1, a transmitter that has received a synchronization signal for synchronizing the operation of the transmitters generates transmission information to be transmitted to the receivers in accordance with the synchronization signal. The transmitter generates identification information for identifying the transmission information and attaches the identification information to the transmission information. The transmitter duplicates the transmission information to which the identification information is attached as identification-attached information and transmits the identification-attached information to each receiver. The receiver receives the multiple pieces of the identification-attached information transmitted from the transmitters and obtains the transmission information on the basis of the multiple pieces of the identification addition information. Further, for example, Patent Literature 2 provides a method and system of a separated optical transport network (OTN) switching system with steps using plug-in universal (PIU) modules.

CITATION LIST

Patent Literature

[Patent Literature 1]
Specification of WO2021/156918
[Patent Literature 2]
Japanese Patent Application Publication Tokukai No. 2018-011289

SUMMARY OF INVENTION

Technical Problem

In the path redundancy system disclosed in Patent Literature 1, the transmitters deliver data to the receivers by using flooding; however, this system cannot avoid occurrence of broadcast storm. In addition, by the system disclosed in Patent Literature 2, a packet lost due to a link failure between the PIU module and the switch cannot be recovered. Further, the system of Patent Literature 2 is premised on wired communication, so that it is not assumed that a link failure occurs due to disturbance.

In the free space optical communication capable of wide-area communication, a communication disconnection of very time may occur due to vibrations or instantaneous obstacles (e.g. birds). The communication disconnection due to such reasons can be immediately restored in usual; however, it can be said that providing an alternative path by protocols such as Rapid Spanning Tree Protocol (RSTP) and Open Shortest Path First (OSPF) is less effective to achieve immediate restoration.

The present disclosure has been made in view of these problems, and an example object thereof is to provide a communication apparatus, a communication system, and a communication method which are capable of withstanding a short-time path failure while reducing the network load in a free space optical communication network.

Solution to Problem

A communication apparatus in accordance with an example aspect of the present disclosure is a communication apparatus included in a plurality of communication apparatuses capable of forming a mesh free space optical communication network, and including at least one processor, the at least one processor carrying out: a communication process of transmitting and receiving packets each including (i) transmission information from a terminal, and (ii) determination information indicating a transmission source communication apparatus included in the communication apparatuses and connected to the terminal, and transmission sequence; and a relay process of using both the determination information of a received packet and the determination information of a packet received in advance from at least one communication apparatus included in the communication apparatuses, to determine whether or not to relay the received packet to at least one communication apparatus in the communication apparatuses, in the communication process, the at least one processor transmitting the received packet determined to be relayed in the relay process to the at least one communication apparatus.

A communication system in accordance with an example aspect of the present disclosure is a system configured to carry out transmission and reception between terminals through a mesh free space optical communication network formed by a plurality of communication apparatuses, at least one communication apparatus included in the communication apparatuses including at least one processor, the at least one processor carrying out: a communication process of transmitting and receiving packets each including (i) transmission information from a terminal, and (ii) determination information indicating a transmission source communication apparatus included in the communication apparatuses and connected to the terminal, and a transmission sequence; and a relay process of using both the determination information of a received packet and the determination information of a packet received in advance from at least one communication apparatus included in the communication apparatuses, to determine whether or not to relay the received packet to at least one communication apparatus in the communication apparatuses, in the communication process, the at least one processor transmitting the received packet determined to be relayed in the relay process to the at least one communication apparatus.

A communication method in accordance with an example aspect of the present disclosure is a method using the abovementioned communication apparatus, the method including: receiving packets each including (i) transmission information from a terminal, and (ii) determination information indicating a transmission source communication apparatus included in the communication apparatuses and connected to the terminal, and a transmission sequence;

using both the determination information of a received packet and the determination information of a packet received in advance from at least one communication apparatus included in the communication apparatuses, to determine whether or not to relay the received packet to at least one communication apparatus in the communication apparatuses; and transmitting the received packet to the at least one communication apparatus when the packet is relayed.

Advantageous Effects of Invention

According to an example aspect of the present disclosure, it is possible to achieve an example advantage of being capable of providing a communication apparatus, a communication method, and a communication system which are capable of withstanding a short-time path failure in a free space optical communication network.

BRIEF DESCRIPTION OF DRAWINGS

FIG. 5 is a diagram illustrating the configuration of a packet transmitted and received by the communication apparatus in accordance with the present disclosure.

FIG. 6 is a flowchart illustrating another example of the flow of the communication method in accordance with the present disclosure.

EXAMPLE EMBODIMENTS

Figure 1:
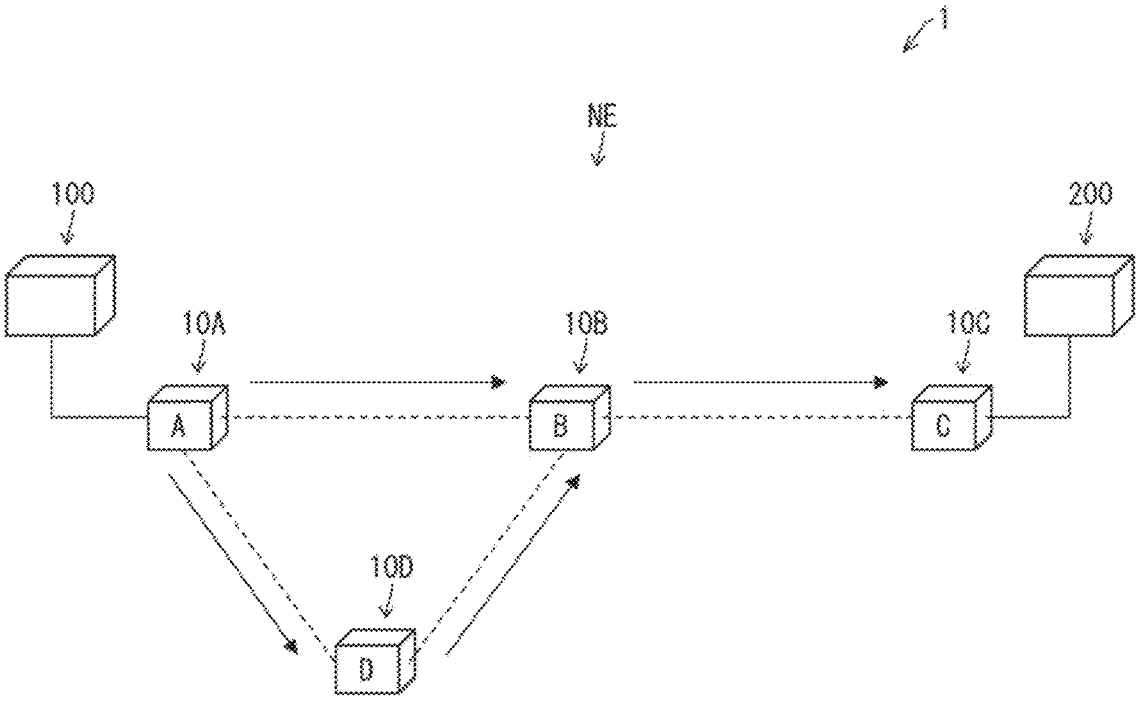
FIG. 1 is a block diagram illustrating the configuration of a communication system in accordance with the present disclosure.

Example embodiments of the present invention will be described below by way of example. It should be noted that the present invention is not limited to the example embodiments described below, but may be altered in various ways by a skilled person within the scope of the claims. For example, any example embodiment derived by appropriately combining technical means employed in the example embodiments described below can be within the scope of the present invention. Further, any example embodiment derived from appropriately omitting some of the technical means employed in the example embodiments described below can also be within the scope of the present invention. Furthermore, an example advantage to which reference is made in each of the example embodiments described below is an example of the advantage expected in that example embodiment, and does not define the extension of the present invention. Therefore, any example embodiment which does not provide the example advantage to which reference is made in each of the example embodiments described below can also be within the scope of the present invention.

First Example Embodiment

A first example embodiment, which is an example of an embodiment of the present invention, will be described in detail with reference to the drawings. The present example embodiment is a basic form of each example embodiment discussed later. It should be noted that the scope of an application of technical means employed in the present example embodiment is not limited to the present example embodiment. That is, each technical means employed in the present example embodiment can be employed also in another example embodiment included in the present disclosure, provided that no particular technical problems occur. In addition, each technical means indicated in the drawings referred to for discussing the present example embodiment can be employed also in another example embodiment included in the present disclosure, provided that no particular technical problems occur.

Configuration of Communication System

The following will describe the configuration of a communication system 1 with reference to FIG. 1. FIG. 1 is a block diagram illustrating the configuration of the communication system 1. As illustrated in FIG. 1, the communication system 1 includes a first terminal 100, a second terminal 200, and a plurality of communication apparatuses 10A to 10D forming a mesh free space optical communication network NE.

In the communication system 1, communication media sent between the first terminal 100 and the second terminal 200 pass through the mesh free space optical communication network NE. The mesh free space optical communication network NE refers to a free space optical communication network in which multiple meshes are formed by free space optical communication paths. To realize this, each of the communication apparatuses 10A to 10D is provided with a plurality of links capable of communicating a communication medium with another communication apparatus by free space optical communication. For example, each of the communication apparatuses 10A to 10D has at least two links and is capable of transmitting a received communication medium (packet) to at least one other communication apparatus. It is preferable that each of the communication apparatuses 10A to 10D be configured to transmit a received packet to two or more other communication apparatuses. This makes it possible to perform flooding of packets.

In the communication system 1 illustrated in FIG. 1, the first terminal 100 is connected to the communication apparatus 10A, and the communication apparatus 10A has a link with each of the two communication apparatuses 10B and 10D. The communication apparatus 10B has a link with the communication apparatus 10A, and a link with each of the communication apparatuses 10C and 10D. The communication apparatus 10D has a link with the communication apparatus 10A and a link with the communication apparatus 10B. The communication apparatus 10C has a link with the communication apparatus 10B and is connected to the second terminal 200.

It should be noted that the communication between the first terminal 100 and the communication apparatus 10A, and the communication between the second terminal 200 and the communication apparatus 10C may be wired or may be wireless. Although FIG. 1 depicts the four communication apparatuses 10A to 10D as communication apparatuses forming the mesh free space optical communication network NE, the number of communication apparatuses is not limited thereto. Although, in the example of FIG. 1, only the communication apparatuses 10A and 10C are connected to the respective terminals (first terminal 100 and second terminal 200), the other communication apparatuses 10B and 10D may be connected to respective additional terminals.

The communication medium (packet) transmitted from each of the communication apparatuses 10A to 10D can be referred to as a directional communication medium. Specific examples of the directional communication medium may include, but not limited to, electromagnetic wave of a high frequency region including a frequency of not less than approximately 10 GHz. Examples of the electromagnetic wave of this frequency region may encompass millimeter wave, submillimeter wave, infrared light, visible light, and ultraviolet light. For example, electromagnetic wave of the frequency region is made to emit in such a manner that the electromagnetic wave is directed at an angle within a given angle range, to use the electromagnetic wave as the abovementioned directional communication medium in communication. The communication apparatus may be configured to include, for example:

- a beam forming antenna that emits millimeter wave or submillimeter wave in such a manner that the millimeter wave or the submillimeter wave is directed at an angle within a given angle range;
- a collimator that collimates infrared light, visible light, or ultraviolet light; and
- a laser oscillator that generates a laser beam of infrared light, visible light, or ultraviolet light.

Configuration of Communication Apparatus

Figure 2:
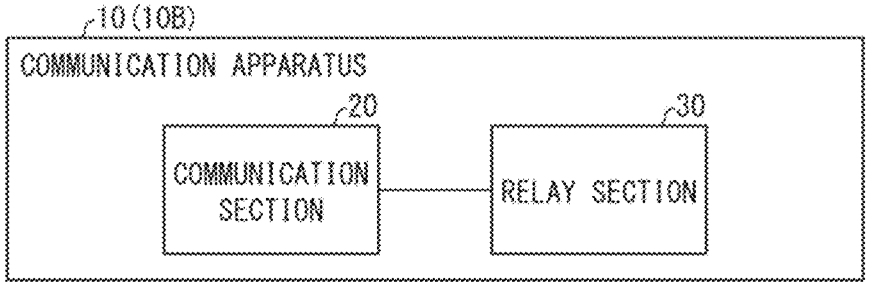
FIG. 2 is a block diagram illustrating the configuration of a communication apparatus in accordance with the present disclosure.

FIG. 2 is a block diagram illustrating the configuration of any one of the communication apparatuses 10A to 10D illustrated in FIG. 1. For convenience of description, FIG. 2 will describe the any communication apparatus 10, taking up the communication apparatus 10B illustrated in FIG. 1. The communication apparatus 10 (10B) illustrated in FIG. 2 is a communication apparatus included in the plurality of communication apparatuses capable of forming the mesh free space optical communication network as described above. The communication apparatus 10 includes a communication section 20 and a relay section 30.

The communication section 20 receives packets each including: transmission information from a terminal; and determination information indicating a transmission source communication apparatus connected to the terminal (first terminal 100, in the example of FIG. 1) in the communication apparatuses, and a transmission sequence. The communication section 20 receives the packets sent from another communication apparatus in the mesh free space optical communication network NE connected with the communication apparatus 10, which is its own communication apparatus, by a link. In the example illustrated in FIG. 1, the communication apparatus 10B is configured to receive packets from the communication apparatus 10A, the communication apparatus 10D, and the communication apparatus 10C, each having the link. The communication section 20 is also configured to transmit packets. As for transmission, the communication section 20 is capable of transmitting packets to other communication apparatuses each having a link with the communication apparatus 10, which is its own communication apparatus.

The packet includes the transmission information from a terminal and the determination information. The transmission information is a net data body to be delivered to the communication target terminal, and may also be referred to as "payload".

For example, the determination information may include information for identifying a communication apparatus connected to a terminal from which the transmission information is transmitted (first terminal 100 in the example of FIG. 1). This communication apparatus is referred to as a transmission source communication apparatus. Since the example of FIG. 1 is an example in which packets are transmitted from the first terminal 100 to the second terminal 200, the communication apparatus 10A, which is connected to the first terminal 100 from which the transmission information is transmitted, corresponds to the transmission source communication apparatus. Therefore, the determination information includes the information for identifying the transmission source communication apparatus 10A.

Further, in addition to the information for identifying the transmission source communication apparatus, the determination information includes information indicating the transmission sequence. The information indicating the transmission sequence may be, for example, information indicating the transmission sequence number of a packet transmitted from the transmission source communication apparatus 10A.

In the example of FIG. 1, the communication apparatus 10A obtains, from the first terminal 100, the transmission information to which control information (receiving terminal information) such as the destination, is added in advance, and attaches the abovementioned determination information to this transmission information, to generate a packet. The generated packet is subjected flooding from the communication apparatus 10A and is transmitted to the communication apparatuses 10B and 10D by free space optical communication (laser communication).

The communication section 20 of the communication apparatus 10B receives the transmitted packet. Here, the communication apparatus 10 is capable of storing a packet that has been received in advance. The communication apparatus 10 may include, for example, a storage section that stores a packet received in advance. The storage section may be configured to be a part of the communication section 20 or the relay section 30, or may be implemented as a separate constituent element in the communication 10. The apparatus communication apparatus 10 may store, for each transmission source communication apparatus, the latest packet of the transmission source communication apparatus. It is possible to determine the latest packet based on the information indicating the transmission sequence included in the determination information.

As a specific example of the example illustrated in FIG. 1, the communication apparatus 10B stores a packet including the sequence information indicating that the packet is the 99th packet transmitted from the transmission source communication apparatus 10A. Although not illustrated in FIG. 1, the communication apparatus 10C and the communication apparatus 10D are connected to respective additional terminals, each of which is a transmission source communication apparatus. Therefore, the communication apparatus 10B also stores both a packet including the sequence information indicating that this packet is the 150th packet transmitted from the transmission source communication apparatus 10C, and a packet including the sequence information indicating that this packet is the 200th packet transmitted from the transmission source communication apparatus 10D.

The relay section 30 uses the determination information of a newly received packet and the determination information of a packet received in advance from at least one communication apparatus included in the communication apparatuses, to determine whether or not to relay the newly received packet. For example, the relay section 30 compares the determination information of the newly received packet with the determination information of the packet that has already been received, and compares the sequence numbers of the sequence information included in the respective pieces of the determination information. Then, the relay section 30 determines whether the sequence number of the determination information of the newly received packet is the same as or is arranged earlier in numerical order than (i.e., indicating that the newly received packet has been transmitted before in time series) the sequence number of the determination information of the packet that has already been received. Then, when the "newly received packet" is determined to has the sequence number falling under these conditions, relay is cut off and the packet is not relayed. On the other hand, when the "newly received packet" is determined to have the sequence number that does not fall under the conditions, the newly received packet is relayed. In the example of FIG. 1, relaying the newly received packet indicates that the communication apparatus 10B delivers the packet received from the communication apparatus 10A to communication channels corresponding to the other communication apparatuses 10C and 10D so that the packet can be transmitted (i.e., by flooding) to the communication apparatus 10C and 10D. On the other hand, cutting off the relay indicates that such delivery is not carried out. In the example of FIG. 1, cutting off the relay indicates that the communication apparatus 10B does not transmit the packet received from the communication apparatus 10A to any of the other communication apparatuses 10C and 10D (i.e., no flooding is carried out).

For example, the relay section 30 may obtain, from the storage section, the determination information of a packet that has already been received. Then, the relay section 30 checks the determination information of the newly received packet against the determination information of the packet that has already been received.

In the example of FIG. 1, the communication apparatus 10B is configured to receive packets of the transmission source communication apparatus 10A through two routes. One route is a route extending along a link established between the communication apparatus 10A and the communication apparatus 10B (this route may also be referred to as "direct path"). The other route is a route passing through the communication apparatus 10D (this route may also be referred to as "redundant path"). A packet subjected to flooding from the communication apparatus 10A is received by the communication apparatus 10B through the direct path and the redundant path. The following will describe transmission paths of packets in terms of a case where both the direct path and the redundant path are available for communication without any problem and a case where a short-time communication failure (communication disconnection) occurs in the direct path.

(i) Case where Both Paths are Available for Communication without any Problem

In a case where both paths are available for communication without any problem, a packet that has passed through the direct path, which has a smaller hop count, is delivered to the communication apparatus 10B earlier. Therefore, with the configuration of the present example embodiment, a packet transmitted through the direct path are always subjected to flooding, and the relay of a packet transmitted through the redundant path is cut off at the relay section 30 of the communication apparatus 10B, which is the delivery destination.

(ii) Case where Short-Time Communication Failure (Communication Disconnection) Occurs in Direct Path In a case where a short-time communication failure (communication disconnection) occurs in the direct path, no packet is delivered through the direct path, and the packet that has passed through the redundant path is received in advance by the communication apparatus 10B and is then subjected to flooding. Here, when the communication apparatus 10A has recognized that a communication failure of the link to the communication apparatus 10B has occurred, the communication apparatus 10A discards the packet without waiting for the resolution of the communication failure.

It should be noted that, in the present example embodiment, some packets identical to each other (i.e., packets having the same transmission information) delivered to a communication apparatus (e.g., communication apparatus 10B) at different timings due to different paths taken may have the same sequence number (e.g., "99") or may have different sequence numbers (e.g., "100" etc.). For the different sequence numbers, a packet having a sequence number arranged earlier in numerical order (e.g., "97") with respect to the sequence number of a packet that has already received (e.g., "99") may be received later from any other communication apparatus. A possible cause of receiving a packet having such an earlier sequence number later is a time difference caused by a difference in operation timing of the communication apparatuses. However, it is implementation dependent, and it is possible to inhibit the occurrence as much as the communication apparatuses are made to operate at the same speed. Another possible cause of receiving a packet having such an earlier sequence number later is that a packet that has passed through the shortest path at the time of recovery of the communication failure overtakes a packet flowing in the bypass route. With regard to this cause, if the present example embodiment is not applied, then all of the packets in the event of a failure will be lost at the time of a short-time communication failure, whereas if the present example embodiment is applied, only packets flowing through the network at the moment of clearance of the communication failure are lost, so that the number of lost packets can be reduced. Therefore, it is sufficient to manage the latest determination information (sequence number) in the storage section.

Example Advantages of Communication System and Communication Apparatus

As described in the foregoing, the communication apparatus 10 (10A to 10D) included in the communication system 1 employs a configuration in which a communication apparatus included in a plurality of communication apparatuses capable of forming a mesh free space optical communication network, the apparatus including: the communication section 20 of transmitting and receiving packets each including (i) transmission information from the first terminal 100, and (ii) determination information indicating a transmission source communication apparatus 10A included in the communication apparatuses and connected to the first terminal 100, and a transmission sequence; and the relay section 30 of using both the determination information of a received packet and the determination information of a packet received in advance from at least one communication apparatus included in the communication apparatuses, to determine whether or not to relay the received packet to at least one communication apparatus in the communication apparatuses, the communication section 20 transmitting the received packet determined to be relayed by the relay section 30 to the at least one communication apparatus. It is configured so that the received packet relayed by the relay section 30 is transmitted to every transmittable communication apparatus, resulting in so-called flooding. Therefore, even in a case where a short-time communication disconnection (failure) of the communication path in any link occurs, it is possible to transmit the packet via another link. In short, it is possible to provide a communication system capable of withstanding a short-time communication disconnection (failure) of a communication path. Further, the relay section 30 is configured so that when a packet received in advance is received again later, the packet received later is not relayed. Thus, it is possible to reduce the network load of the free space optical communication network. These example advantages will be described below in conjunction with descriptions of the flow of the communication method.

Flow of Communication Method

Figure 3:
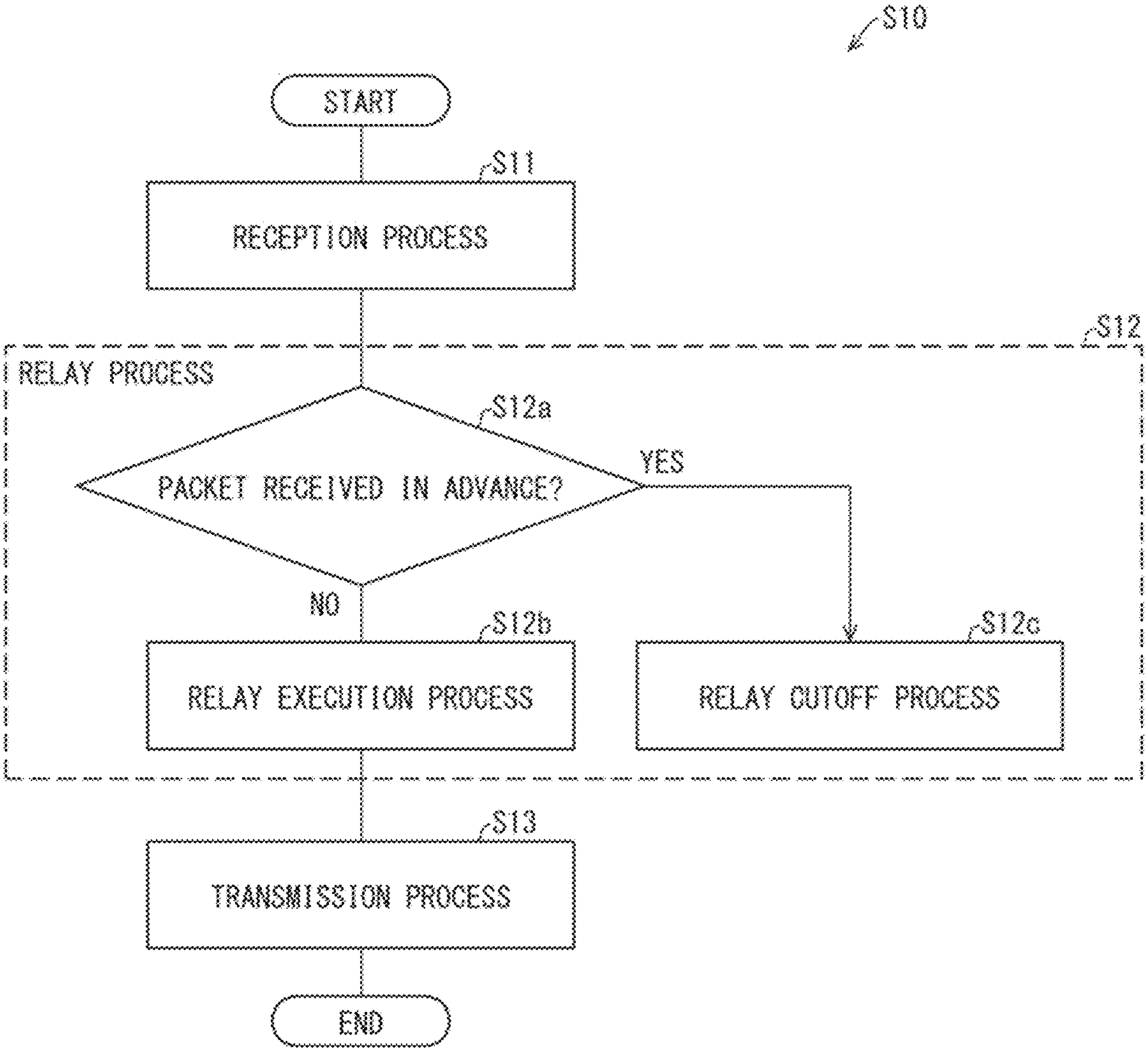
FIG. 3 is a flowchart illustrating the flow of a communication method in accordance with the present disclosure.

The following will describe the flow of a communication method S10 using the communication apparatus 10 in the communication system described above, with reference to FIG. 3. FIG. 3 is a flowchart illustrating the flow of the communication method S10. The communication method S10 includes a reception process S11, a relay process S12, and a transmission process S13. Hereunder, the communication method S10 will be described focusing on the communication apparatus 10B of FIG. 1.

In the reception process of step S11, the communication apparatus 10B receives a packet sent from the communication apparatus 10A, which is the transmission source connected to the first terminal 100 (this packet may also be referred to as the "first packet P" for convenience of description). The packet is received by the communication section 20. The transmission source communication apparatus 10A transmits the first packet P to both the other communication apparatuses 10B and 10D having the links (flooding). When the communication section 20 of the communication apparatus 10B receives the first packet P transmitted from the communication apparatus 10A, the process proceeds to the relay process (step S12).

In the relay process of step S12, the relay section 30 of the communication apparatus 10B uses the determination information of the first packet P received in the reception process of the step S11 and the determination information of a packet that has already been received, to determine whether or not to relay the first packet P (step S12*a*). In other words, it is determined whether or not the first packet P received in the reception process of the step S11 has already been received. For example, this determination is performed by comparing the sequence numbers as described above.

In a case where it is determined that the first packet P is not an already received packet (determined to be NO in step S12*a*), the process proceeds to step S12*b*. In step S12*b*, the relay section 30 relays the first packet P to the communication section 20 so as to allow the first packet P to be transmitted to the communication apparatuses 10C and 10D with which the communication apparatus 10B forms the links. Upon receiving the first packet P relayed by the relay section 30, the communication section 20 transmits the first packet P to every communication apparatus having the link, that is, the communication apparatuses 10C and 10D (flooding) (step S13).

Meanwhile, when it is determined in step S12*a* that the first packet P is identical to the packet that has already been received (determined to be YES in step S12*a*), the first packet P is not relayed (step S12*c*). For example, in this case, the first packet P is discarded by the relay section 30.

Example Advantages of Communication Method

According to the communication method S10 described in the foregoing, first, the communication apparatus 10A transmits (flooding) a packet (first packet P) to both the communication apparatus 10B and the communication apparatus 10D. Therefore, even in a case where a momentary failure (communication disconnection) occurs in communication between the communication apparatus 10A and the communication apparatus 10B as an example, the first packet P transmitted from the communication apparatus 10A via the communication apparatus 10D is delivered to the communication 10B. Accordingly, the first packet P is received by the second terminal 200, which is the communication target, via the communication apparatus 10C.

Further, since it is configured so that a packet that has already been received is not relayed by providing the relay section 30, it is possible to reduce the network load concerned when flooding is simply introduced.

Further, in a case where a momentary failure (communication disconnection) caused between the communication apparatus 10A and the communication apparatus 10B is resolved and the communication resumes, even when the first packet P is directly transmitted from the communication apparatus 10A to the communication apparatus 10B, the relay section 30 of the communication apparatus 10B can ascertain that the first packet P has been received first from the communication apparatus 10D. In short, the first packet P has been received in advance from the communication apparatus 10D and has already been transmitted, or relayed, to the communication apparatus 10C. Therefore, even when the first packet P is received directly from the communication apparatus 10A after that, the relay section 30 cuts off the relay of this first packet P (step S12*c*). Thus, it is possible to avoid duplicate transmission of the first packet P.

Further, when flooding is implemented in communication apparatuses capable of forming a loop-like network, a packet may continue to go around the loop and may cause so-called broadcast storm. However, since the relay section 30 provided is configured not to transmit the packet received in advance, the received packet is not relayed, so that the packet does not continue to go around the loop.

Second Example Embodiment

A second example embodiment, which is an example of the embodiment of the present invention, will be described in detail with reference to the drawings. The same reference symbols are given to constituent elements which have functions identical to those described in the above example embodiment, and descriptions as to such constituent elements are omitted as appropriate. It should be noted that the scope of an application of technical means employed in the present example embodiment is not limited to the present example embodiment. That is, technical means employed in the present example embodiment can be employed also in another example embodiment included in the present disclosure, provided that no particular technical problems occur. In addition, each technical means illustrated in each drawing referred to for discussing the present example embodiment can be employed also in another example embodiment included in the present disclosure, provided that no particular technical problems occur.

Configuration of Communication System

Since the configuration of the communication system of the present example embodiment is the same as that described with reference to FIG. 1, descriptions thereof are omitted here.

Configuration of Communication Apparatus

Figure 4:
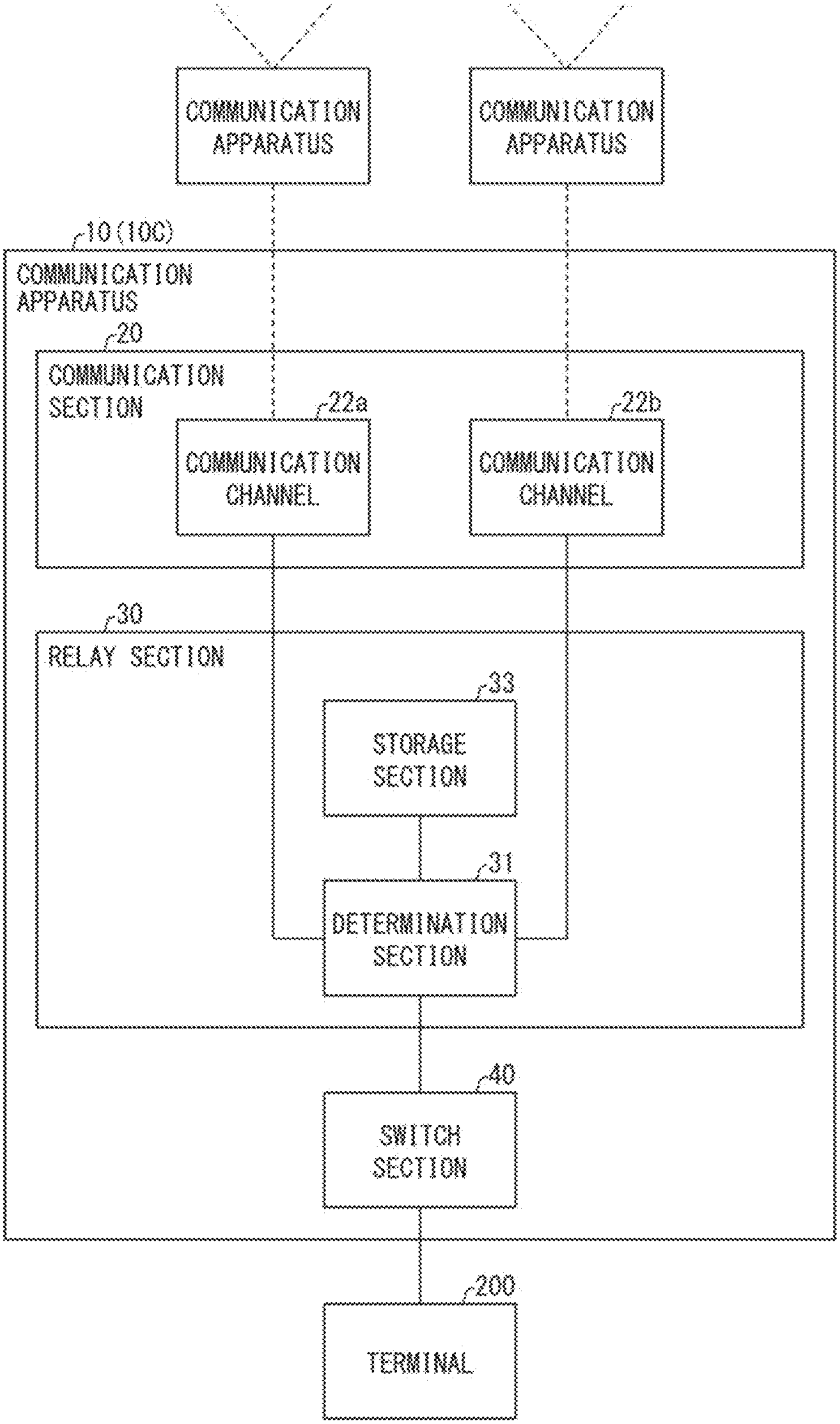
FIG. 4 is a block diagram illustrating another example of the configuration of the communication apparatus in accordance with the present disclosure.

The following will describe the configurations of the communication apparatuses 10A to 10D included in the communication system of the present example embodiment, with reference to FIG. 4. FIG. 4 is a block diagram illustrating the configuration of any of the communication apparatuses capable of forming the mesh free space optical communication network of the communication system of the present example embodiment. Similarly to FIG. 2, FIG. 4 will describe the communication apparatus 10C connected to the second terminal 200 as the communication apparatus 10 freely-chosen from among the communication apparatuses illustrated in FIG. 1. It should be noted that the other communication apparatuses 10A, 10B, and 10D have the same configuration.

The communication apparatus 10 illustrated in FIG. 4 is a communication apparatus included in the plurality of communication apparatuses capable of forming the mesh free space optical communication network as described above. The communication apparatus 10 includes a communication section 20, a relay section 30, and a switch section 40 (switch section, attaching section).

The communication section 20 includes communication channels 22*a* and 22*b*. Each of the communication channels 22*a* and 22*b* forms a link with a communication channel of a communication section of another communication apparatus. Each communication channel 22*a*, 22*b* is capable of carrying out transmission and reception of packets to and from a communication channel of a link destination by free space optical communication. Although FIG. 4 depicts an example in which two communication channels 22*a* and 22*b* are provided, the number of communication channels is not limited thereto.

Since the packet is a directional communication medium as described in the first example embodiment, descriptions thereof are omitted here. The communication section 20 includes the communication channels 22*a* and 22*b*, and is configured to receive a packet by one communication channel and to transmit the packet by the other communication channel. This enables packet flooding.

The relay section 30 obtains the packet received by the communication section 20. The packet the relay section 30 obtains can be relayed to the communication section 20. Here, the relay section 30 may be configured to obtain a packet sent from any other communication apparatus 10 and received by one communication channel 22*a* of the communication section 20, and to send the packet to the other communication channel 22*b* of the communication section 20 if it is possible to perform relay. However, the present invention is not limited thereto. As another example, it may be configured so that: the communication channels send therebetween a packet; one communication channel 22*a* duplicates the packet received from any other communication apparatus; the relay section 30 is made to receive the duplicated packet and to determine whether or not to relay the packet; and the original packet before duplication is sent from the one communication channel 22*a* to the other communication channel 22*b*.

Hereunder, the configuration of a packet will be described with reference to FIG. 5. Each packet transmitted to and received from the communication apparatuses includes transmission information (payload), which is a net data body sent from a transmission source terminal (first terminal 100 in the example of FIG. 1) and delivered to a communication target terminal. The packet further includes determination information. As described in the first example embodiment, the determination information includes information for identifying the communication apparatus 10A connected to the terminal (first terminal 100 in the example of FIG. 1) that transmits the transmission information (i.e., transmission source apparatus ID in FIG. 5). Further, in addition to the information for identifying the transmission source communication apparatus, the determination information includes information indicating the transmission sequence. The information indicating the transmission sequence is information indicating the transmission sequence number of the packet transmitted from the transmission source communication apparatus 10A (sequence number in FIG. 5).

A constituent element configured to attach the abovementioned information for identifying the communication apparatus and the information indicating the transmission sequence to the transmission information (payload) to which the control information, such as the destination, added in advance is the switch section 40 (attaching section) illustrated in FIG. 4. The communication apparatus 10 (10C) illustrated in FIG. 4 is a communication apparatus connected to the second terminal 200 illustrated in FIG. 1, so that when a packet is transmitted from the second terminal 200, the switch section 40 illustrated in FIG. 4 attaches the information for identifying the communication apparatus 10C and the information indicating the transmission sequence to the transmission information of the packet (payload to which the control information has been added in advance).

As illustrated in FIG. 4, the relay section 30 includes a determination section 31 and a storage section 33. The storage section 33 stores a packet received in advance. The storage section 33 may store, for each transmission source communication apparatus, the latest packet of the transmission source communication apparatus. It is possible to determine the latest packet based on the information indicating the transmission sequence included in the determination information. It should be noted that it is not limited to storing of the packet, but, for example, only the determination information of the received packet may be accumulated in a database. Further, the storage section 33 is configured to be a part of the relay section 30, but is not limited thereto. For example, the storage section 33 may be configured to be a part of the communication section 20 or may be implemented as a separate constituent element in the communication apparatus 10.

FIG. 6 schematically illustrates a database stored in the storage section 33 as an example. FIG. 6 illustrates a database DB of the storage section 33 of the communication apparatus 10B illustrated in FIG. 1. The database DB stores, for each transmission source communication apparatus, the transmission source communication apparatus and the sequence number of the latest packet of the packets received in advance by the transmission source communication apparatus in association with each other. As illustrated in FIG. 6, when a packet to which the sequence number "100" is assigned is received from the transmission source communication apparatus 10A, the database DB stored in the storage section 33 is updated such that the sequence number "99" corresponding to the communication apparatus 10A is replaced with "100". The database DB illustrated in FIG. 6 shows that a packet with a sequence number of "150" is the latest packet received from the communication apparatus 10C. The database DB illustrated in FIG. 6 also shows that a packet with a sequence number of "200" is the latest packet received from the communication apparatus 10D. The sequence number starts from "1" and indicates that a packet having a greater number which is arranged later in numerical order is a newer packet sent.

In the present example embodiment, it is assumed that when the database DB has stored therein the sequence number "99" for the communication apparatus 10A, all of the packets with the sequence numbers "1" to "98", which appears earlier in numerical order than the sequence number "99", have been received by its own communication apparatus (i.e., communication apparatus 10B).

The determination section 31 obtains the received packet and checks the determination information of the packet against the database DB, to determine by the comparison whether the sequence number included in the determination information of the packet is the same as or is arranged earlier in numerical order than the sequence number of the same transmission source communication apparatus in the database DB, or is arranged later in numerical order than the sequence number of the same transmission source communication apparatus in the database DB. Then, when the sequence number of the packet is arranged later in numerical order than the sequence number of the same transmission source communication apparatus in the database DB, the determination section 31 relays the packet to another communication channel. On the other hand, when the sequence number of the packet is the same as or is arranged earlier in numerical order than the sequence number of the same transmission source communication apparatus in the database DB, the relay is cut off. When cutting off the relay, the relay section 30 discards the received packet.

That is, the relay section 30 is configured to store the sequence information for each communication apparatus, and to relay the received packet when the sequence number of the received packet is arranged later in numerical order than the sequence number stored in associated with the same transmission source communication apparatus as that of the received packet, to perform flooding.

In the present example embodiment, in the mesh free space optical communication network NE, the communication apparatuses are connected to each other with links. Thus, as described above, packets identical to each other (packets having the same determination information) are delivered to a single communication apparatus through separate paths. If every delivered packet is subjected to flooding every time it is delivered, the network load may be inconveniently increased, resulting in a communication failure or system failure. However, by providing the relay section 30, it is possible to stop performing flooding when a received packet is identical to a packet that has already been received, that is, a packet that has already been subjected to flooding. Thus, it is possible to perform flooding while reducing the network load.

For example, since the relay section 30 is provided as in the present example embodiment, the packet is duplicated by as much as the number of links included in the network; however, the packet does not further duplicated and it is possible to prevent a squeeze on the band.

Here, taking the communication system illustrated in FIG. 1 as an example, there is a slight difference between a delivered timing of a packet delivered from the communication apparatus 10A to the communication apparatus 10B, which are connected each other by a link, and a delivered timing of an identical packet delivered from the communication apparatus 10A to the communication apparatus 10B through a redundant path via the communication apparatus 10D, and the packet that has passed through the redundant path is delivered slightly later. Therefore, when there is no communication disconnection occurring between the communication apparatus 10A and the communication apparatus 10B, the packet delivered to the communication apparatus 10B through the redundant path is discarded without being relayed. On the other hand, when a short-time communication disconnection occurs in the link between the communication apparatus 10A and the communication apparatus 10B, the packet that has passed through the redundant path is delivered to the communication apparatus 10B earlier and is subjected to flooding. Here, when the communication apparatus 10A has recognized that a communication failure of the link to the communication apparatus 10B has occurred, the communication apparatus 10A discards the packet without waiting for the resolution of the communication failure.

The switch section 40 obtains the packet relayed by the relay section 30. Then, based on the information on the destination included in the packet, that is, the receiving terminal information indicating a terminal to which the transmission information is intended to be delivered, the switch section 40 determines whether or not the terminal (second terminal 200) to which its own communication apparatus (communication apparatus 10 (10C)) is connected is the terminal indicated by the receiving terminal information. Then, when the terminal (second terminal 200) to which its own communication apparatus (communication apparatus 10 (10C)) is connected is the terminal indicated by the receiving terminal information, the switch section 40 removes the determination information from the packet and transmits the transmission information included in the packet to the terminal (second terminal 200).

Flow of Communication Method

Figure 7:
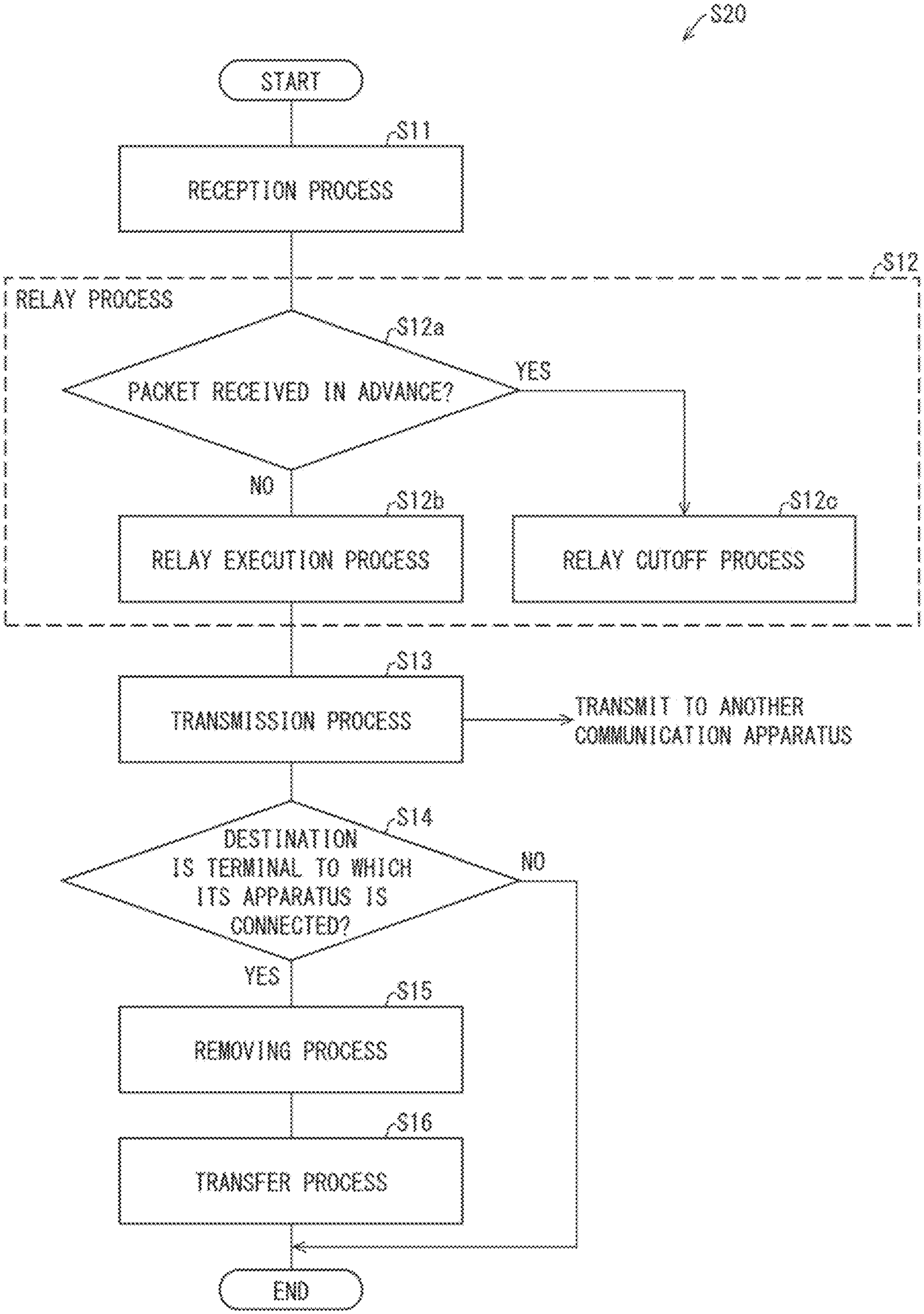
FIG. 7 is a flowchart illustrating another example of the flow of the communication system in accordance with the present disclosure.

The following g will describe the flow of a communication method S20 using the communication apparatus 10 in the communication system described above, with reference to FIG. 7. FIG. 7 is a flowchart illustrating the flow of the communication method S20. The communication method S20 includes a reception process S11, which has been described in the first example embodiment, and a relay process S12. The communication method S20 also includes a transmission process S13, a destination determination process S14, a removing process S15, and a transfer process S16. Hereunder, the communication method S20 will be described focusing on the communication apparatus 10C of FIG. 1. Since the reception process S11 has been described in the first example embodiment, descriptions thereof are omitted here.

In the relay process of step S12, it is determined whether or not the packet (first packet P) received in the reception process of the step S11 has already been received. As described above, the determination on whether or not the first packet P received in the reception process of the step S11 is identical to the packet that has already been received is made by checking the determination information attached each packet against the determination information in the database stored in the storage section 33. Since this has been described in the present example embodiment, descriptions thereof are omitted here.

When the first packet P received in the reception process of step S11 is not identical to the packet that has already been received (determined to be NO in step S12*a*), the relay section 30 relays the first packet P to the communication section 20 so as to transmit the first packet P to another communication apparatus with which its own communication apparatus (communication apparatus 10C) forms a link (step S12*b*).

A communication channel (e.g., communication channel 22*a*) of the communication section that has received the first packet P relayed in step S12*b* transmits the first packet P to another communication apparatus having the link (transmission process S13).

Further, when the first packet P is relayed in step S12*b*, the relay section 30 also transmits the first packet P to the switch section 40.

In step S14 of FIG. 7, the switch section 40 obtains the receiving terminal information from the determination information of the first packet P and determines whether or not a terminal set as the communication target is the terminal to which its own apparatus is connected. When the terminal set as the communication target is the terminal to which its own apparatus is connected, the process proceeds to step S15. When the terminal set as the communication target is not the terminal to which its own apparatus is connected, the flow ends.

In step S15, the switch section 40 removes the determination information from the abovementioned packet.

In step S16, the switch section 40 transfers the transmission information, from which the determination information has been removed in step S15, to the second terminal 200. The sequence of the flow is completed thereby.

Variations of Relay Section

The relay section 30 may be configured to send back to a communication apparatus that has sent a packet determined not to be relayed, information (signal) indicating that the packet is not relayed.

Example Advantages of Communication Apparatus

As described above, in the communication apparatus 10, the relay section 30 compares the determination information of a received packet with the determination information of a packet received in advance from at least one communication apparatus included in the communication apparatuses. Then, it is determined by the comparison whether the sequence number included in the determination information of the received packet is the same as or is arranged earlier in numerical order than the sequence number of the same transmission source communication apparatus in the database DB, or is arranged later in numerical order than the sequence number of the same transmission source communication apparatus in the database DB. It is configured so that when the sequence number included in the determination information of the received packet is the same as or is arranged earlier in numerical order than the sequence number of the same transmission source communication apparatus in the database DB, the received packet is discarded. Thus, in addition to the example advantage achieved by the first example embodiment described above, use of the communication apparatus 10 can prevent the amount of data of packets delivered by flooding from exceeding the data capacity of the communication apparatus, and this can prevent a communication failure that might be caused thereby, so that it is possible to provide a superior free space optical communication environment.

Hereunder, an example of the example advantage achieved by the communication system (communication apparatus) in accordance with the present example embodiment will be described with reference to FIG. 8. The same example advantage is achieved by the first example embodiment described above.

Figure 8:
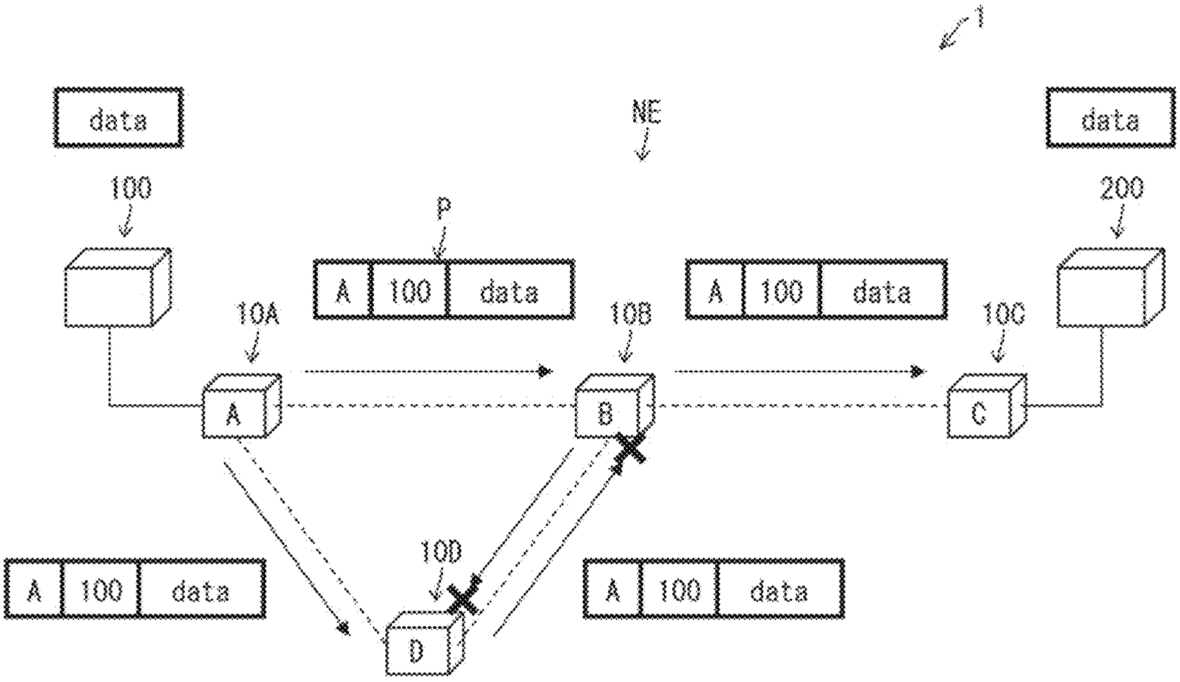
FIG. 8 is a diagram illustrating the data configuration of a packet transmitted and received by the communication apparatus in accordance with the present disclosure.

FIG. 8 illustrates the communication system illustrated in FIG. 1 and schematically illustrates an example of a packet. In FIG. 8, it is assumed that all the links connecting communication apparatuses are configured to communicate packets at the same packet communication speed.

The first terminal 100 illustrated in FIG. 8 transmits the transmission information ("data" in FIG. 8) to the communication apparatus 10A connected to the first terminal 100. The communication apparatus 10A that has received the transmission information attaches the determination information by the switch section 40 (FIG. 4). The determination information includes the information for identifying the transmission source communication apparatus ("A" in FIG. 8) and the transmission sequence number ("100" in FIG. 8), as described above. In FIG. 8, a packet to which these are attached is indicated by "P". The communication apparatus 10A transmits the packet P to the communication apparatus 10B and the communication apparatus 10D, which have links, and at substantially the same timing, the communication apparatus 10B and the communication apparatus 10D receive the packet P. For convenience of description, it is assumed that each of the communication apparatuses 10B and 10D relays the packet P received from the communication apparatus 10A. At this time, each of the communication apparatuses 10B and 10D stores the packet P or the determination information of the packet P. Then, the packet P is subjected to flooding from each of the communication apparatuses 10B and 10D. Specifically, the packet P subjected to flooding from the communication apparatus 10B is directed to both the communication apparatus 10C and the communication apparatus 10D. Further, the packet P subjected to flooding from the communication apparatus 10D is directed to the communication apparatus 10B. At this time, the packet P directed from the communication apparatus 10D to the communication apparatus 10B is identical to the packet P (packet that has already been received) directly transmitted from the communication apparatus 10A to the communication apparatus 10B. This is determined by the relay section 30 of the communication apparatus 10B based on the sequence number, and the packet P that has been directed from the communication apparatus 10D to the communication apparatus 10B is discarded and is not subjected to further flooding. Out of the packets P sent by flooding from the communication apparatus 10B to the communication apparatuses 10C and 10D, the packet P directed to the communication apparatus 10D is identical to the packet P that has been delivered directly from the communication apparatus 10A to the communication apparatus 10D (packet that has already been received). This is determined by the relay section 30 of the communication apparatus 10D based on the sequence number, and the packet P that has been directed from the communication apparatus 10B to the communication apparatus 10D is discarded and is not subjected to further flooding.

Here, a determination on whether or not the received packet P is identical to the packet P received in advance is made in the determination section 31 of the relay section 30, as described above. That is, the determination section 31 is configured so as to check, for each transmission source communication apparatus, the sequence number of the received packet against the sequence numbers of packets received in advance. This achieves an example advantage that it is possible to determine the appropriateness of performing the flooding without carrying out any complicated determination process.

This is because each communication apparatus 10 is configured so as to include the switch section 40 (attaching section) that attaches the identification information indicating its own communication apparatus and the sequence information indicating the sequence number, to the transmission information sent from the terminal connected to its own apparatus. This allows the determination section 31 to make a determination based on the sequence number.

Further, each communication apparatus 10 is provided with the switch section 40 described above. Thus, it is configured so that when a terminal to which its own apparatus is connected is a terminal indicated in the receiving terminal information included in the packet P, the determination information is removed from the packet P, and then the transmission information is transmitted to the terminal. In the example of FIG. 8, the communication apparatus 10C receives the packet P from the communication apparatus 10B and the packet P includes the receiving terminal information indicating that the communication target is the communication apparatus 10C. In this case, the switch section 40 of the communication apparatus 10C removes the determination information from the packet P and transfers the transmission information (data) to the second terminal 200. This makes the transmission information delivered from the first terminal 100 to the second terminal 200.

Software Implementation Example

Some or all of functions of the communication apparatus 10 (hereinafter, also referred to as "the abovementioned sections") may be realized by hardware such as an integrated circuit (IC chip) or may be alternatively realized by software.

Figure 9:
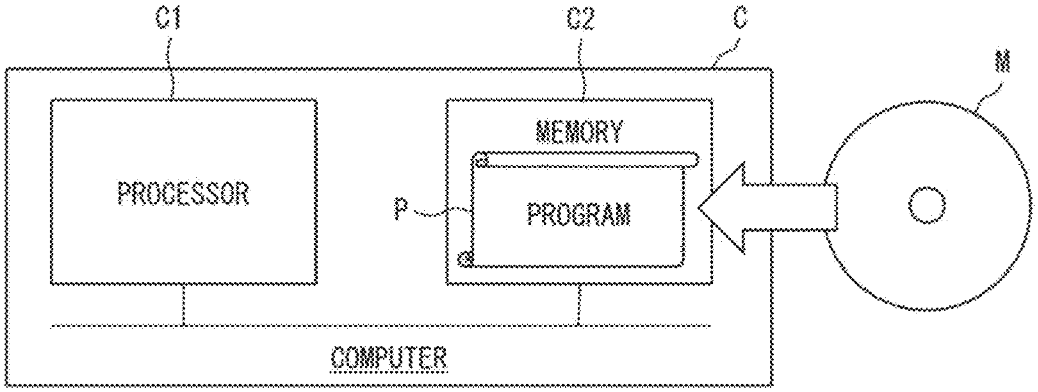
FIG. 9 is a block diagram illustrating the configuration of a computer that functions as the communication system in accordance with the present disclosure.

In the latter case, the abovementioned sections are implemented by, for example, a computer that executes instructions of a program that is software implementing the foregoing functions. FIG. 9 illustrates an example of such a computer (hereinafter referred to as "computer C"). FIG. 9 is a block diagram illustrating the hardware configuration of the computer C that functions as the abovementioned sections.

The computer C includes at least one processor C1 and at least one memory C2. The memory C2 stores a program P for causing the computer C to function as the abovementioned sections. The processor C1 of the computer C retrieves the program P from the memory C2 and executes the program P, so that the functions of the abovementioned sections are implemented.

The processor C1 may be, for example, a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination thereof. The memory C2 may be, for example, a flash memory, a hard disk drive (HDD), a solid state drive (SSD), or a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input/output interface for connecting input/output apparatuses such as a keyboard, a mouse, a display and a printer.

The program P can be stored in a non-transitory tangible storage medium M which is readable by the computer C. Such a storage medium M may be, for example, a tape, a disk, a card, a semiconductor memory, a programmable logic circuit, or the like. The computer C can acquire the program P via the storage medium M. The program P can also be transmitted via a transmission medium. The transmission medium may be, for example, a communications network, a broadcast wave, or the like. The computer C can obtain the program P also via such a transmission medium.

Additional Remark 1

The present disclosure includes techniques described in supplementary notes below. Note, however, that the present invention is not limited to the techniques described in supplementary notes below, but may be altered in various ways by a skilled person within the scope of the claims.

Supplementary Note 1

A communication apparatus included in a plurality of communication apparatuses capable of forming a mesh free space optical communication network, the apparatus including:

a communication section that transmits and receives packets each including (i) transmission information from a terminal, and (ii) determination information indicating a transmission source communication apparatus included in the communication apparatuses and connected to the terminal, and a transmission sequence; and a relay section that uses both the determination information of a received packet and the determination information of a packet received in advance from at least one communication apparatus included in the communication apparatuses, to determine whether or not to relay the received packet to at least one communication apparatus in the communication apparatuses, the communication section transmitting the received packet determined to be relayed by the relay section to the at least one communication apparatus.

Supplementary Note 2

The communication apparatus according to Supplementary note 1, wherein the determination information includes identification information indicating the transmission source communication apparatus connected to the terminal and sequence information indicating a sequence number of the transmission information, and the relay section discards the received packet when the sequence number indicated in the sequence information of the received packet is the same as or is arranged earlier in numerical order than the sequence number indicated in the sequence information of the packet received in advance from the at least one communication apparatus included in the communication apparatuses.

Supplementary Note 3

The communication apparatus according to Supplementary note 1 or 2, wherein the determination information includes identification information indicating the transmission source communication apparatus connected to the terminal and sequence information indicating a sequence number of the transmission information, the relay section includes a determination section that compares, for each transmission source communication apparatus, the sequence number of the received packet and the sequence number of the packet received in advance, and when a comparison result obtained by the determination section indicates that (I) the sequence number indicated in the sequence information of the received packet is arranged later in numerical order than the sequence number indicated in the sequence information of the packet received in advance from the at least one communication apparatus included in the communication apparatuses, the relay section relays the received packet to the at least one communication apparatus in the communication apparatuses, and when the comparison result indicates that (II) the sequence number indicated in the sequence information of the received packet is the same as or is arranged earlier in numerical order than the sequence number indicated in the sequence information of the packet received in advance from the at least one communication apparatus included in the communication apparatuses, the relay section cuts off the relay.

Supplementary Note 4

The communication apparatus according to any one of Supplementary notes 1 to 3, wherein to the communication apparatus, the terminal is connected, the apparatus further including an attaching section that attaches, to the transmission information transmitted from the terminal, the identification information indicating the communication apparatus in which the at least one processor is included and the sequence information indicating the sequence number.

Supplementary Note 5

The communication apparatus according to any one of Supplementary notes 1 to 4, wherein each of the packets includes receiving terminal information indicating a terminal to which the transmission information is intended to be delivered, the apparatus further including a switch section that removes the determination information from the packet transmits the transmission information included in the packet to the terminal, when a terminal to which the communication apparatus is connected is the terminal indicated in the receiving terminal information of the packet received by the communication section.

Supplementary Note 6

A communication system configured to carry out transmission and reception between terminals through a mesh free space optical communication network formed by a plurality of communication apparatuses, at least one communication apparatus included in the communication apparatuses including:

a communication section that transmits and receives packets each including (i) transmission information terminal, and (ii) determination information indicating a transmission source communication apparatus included in the communication apparatuses and connected to the terminal, and a transmission sequence; and a relay section that uses both the determination information of a received packet and the determination information of a packet received in advance from at least one communication apparatus included in the communication apparatuses, to determine whether or not to relay the received packet to at least one communication apparatus in the communication apparatuses, the communication section transmitting the received packet determined to be relayed by the relay section to the at least one communication apparatus.

Supplementary Note 7

The communication system according to Supplementary note 6, wherein the determination information includes identification information indicating the transmission source communication apparatus connected to the terminal and sequence information indicating a sequence number of the transmission information, and the relay section discards the received packet when the sequence number indicated in the sequence information of the received packet is the same as or is arranged earlier in numerical order than the sequence number indicated in the sequence information of the packet received in advance from the at least one communication apparatus included in the communication apparatuses.

Supplementary Note 8

The communication system according to Supplementary note 6 or 7, wherein the determination information includes identification information indicating the transmission source communication apparatus connected to the terminal and sequence information indicating a sequence number of the transmission information, the relay section includes a determination section that compares, for each transmission source communication apparatus, the sequence number of the received packet and the sequence number of the packet received in advance, and when a comparison result obtained by the determination section indicates that (I) the sequence number indicated in the sequence information of the received packet is arranged later in numerical order than the sequence number indicated in the sequence information of the packet received in advance from the at least one communication apparatus included in the communication apparatuses, the relay section relays the received packet to the at least one communication apparatus in the communication apparatuses, and when the comparison result indicates that (II) the sequence number indicated in the sequence information of the received packet is the same as or is arranged earlier in numerical order than the sequence number indicated in the sequence information of the packet received in advance from the at least one communication apparatus included in the communication apparatuses, the relay section cuts off the relay.

Supplementary Note 9

The communication system according to any one of Supplementary notes 6 to 8, wherein in the communication apparatus to which the terminal is connected, the apparatus further including an attaching section that attaches, to the transmission information transmitted from the terminal, the identification information indicating the communication apparatus in which the at least one processor is included and the sequence information indicating the sequence number.

Supplementary Note 10

The communication system according to any one of Supplementary notes 6 to 9, wherein each of the packets includes receiving terminal information indicating a terminal to which the transmission information is intended to be delivered, and the apparatus further including a switch section that removes the determination information from the packet and transmits the transmission information included in the packet to the terminal, when a terminal to which the communication apparatus is connected is the terminal indicated in the receiving terminal information of the packet received by the communication section.

Supplementary Note 11

A communication method using the communication apparatus according to any one of Supplementary notes 1 to 5, the method including:

receiving packets each including (i) transmission information from a terminal, and (ii) determination information indicating a transmission source communication apparatus included in the communication apparatuses and connected to the terminal, and a transmission sequence;

using both the determination information of a received packet and the determination information of a packet received in advance from at least one communication apparatus included in the communication apparatuses, to determine whether or not to relay the received packet to at least one communication apparatus in the communication apparatuses; and transmitting the received packet to the at least one communication apparatus when the packet is relayed.

Supplementary Note 12

A program for causing a computer to operate as the communication apparatus according to any one of Supplementary notes 1 to 5, the program causing the computer to function as each of the sections.

Additional Remark 2

The present disclosure includes techniques described in supplementary notes below. Note, however, that the present invention is not limited to the techniques described in supplementary notes below, but may be altered in various ways by a skilled person within the scope of the claims.

Supplementary Note 1

A communication apparatus included in a plurality of communication apparatuses capable of forming a mesh free space optical communication network, the apparatus including a communication section and at least one processor, the communication section transmitting and receiving packets each including (i) transmission information from a terminal, and (ii) determination information indicating a transmission source communication apparatus included in the communication apparatuses and connected to the terminal, and a transmission sequence, the at least one processor carrying out a process of using both the determination information of a received packet and the determination information of a packet received in advance from at least one communication apparatus included in the communication apparatuses, to determine whether or not to relay the received packet to at least one communication apparatus in the communication apparatuses, the communication section transmitting the received packet determined to be relayed in the process of determining, to the at least one communication apparatus.

The communication apparatus may further include a memory. Further, the memory may store a program for causing the at least one processor to carry out each of the processes.

Supplementary Note 2

The communication apparatus according to Supplementary note 1, wherein the determination information includes identification information indicating the transmission source communication apparatus connected to the terminal and sequence information indicating a sequence number of the transmission information, and in the process of determining, the at least one processor further carries out a process of discarding the received packet when the sequence number indicated in the sequence information of the received packet is the same as or is arranged earlier in numerical order than the sequence number indicated in the sequence information of the packet received in advance from the at least one communication apparatus included in the communication apparatuses.

Supplementary Note 3

The communication apparatus according to Supplementary note 1 or 2, wherein the determination information includes identification information indicating the transmission source communication apparatus connected to the terminal and sequence information indicating a sequence number of the transmission information, the at least one processor carries out, in the process of determining, a process of comparing, for each transmission source communication apparatus, the sequence number of the received packet and the sequence number of the packet received in advance, and in the process of determining, when a comparison result obtained in the process of comparing indicates that (I) the sequence number indicated in the sequence information of the received packet is arranged later in numerical order than the sequence number indicated in the sequence information of the packet received in advance from the at least one communication apparatus included in the communication apparatuses, the at least one processor relays the received packet to the at least one communication apparatus in the communication apparatuses, and when the comparison result indicates that (II) the sequence number indicated in the sequence information of the received packet is the same as or is arranged earlier in numerical order than the sequence number indicated in the sequence information of the packet received in advance from the at least one communication apparatus included in the communication apparatuses, the at least one processor cuts off the relay.

Supplementary Note 4

The communication apparatus according to any one of Supplementary notes 1 to 3, the at least one processor carries out a process of attaching, to the transmission information transmitted from a terminal connected to the communication apparatus in which the at least one processor is included, the identification information indicating the communication apparatus and the sequence information indicating the sequence number.

Supplementary Note 5

The communication apparatus according to any one of Supplementary notes 1 to 4, wherein each of the packets includes receiving terminal information indicating a terminal to which the transmission information is intended to be delivered, and when a terminal to which the communication apparatus is connected is the terminal indicated in the receiving terminal information of the packet received by the communication section, the at least one processor carries out a switching process of removing the determination information from the packet and transmitting the transmission information included in the packet to the terminal.

Supplementary Note 6

A communication system configured to carry out transmission and reception between terminals through a mesh free space optical communication network formed by a plurality of communication apparatuses, at least one communication apparatus included in the communication apparatuses including a communication section and at least one processor, the communication section transmitting and receiving packets each including (i) transmission information from a terminal, and (ii) determination information indicating a transmission source communication apparatus included in the communication apparatuses and connected to the terminal, and a transmission sequence, the at least one processor carrying out a process of using both the determination information of a received packet and the determination information of a packet received in advance from at least one communication apparatus included in the communication apparatuses, to determine whether or not to relay the received packet to at least one communication apparatus in the communication apparatuses, the communication section transmitting the received packet determined to be relayed in the process of determining, to the at least one communication apparatus.

Supplementary Note 7

The communication system according to Supplementary note 6, wherein the determination information includes identification information indicating the transmission source communication apparatus connected to the terminal and sequence information indicating a sequence number of the transmission information, and in the process of determining, the at least one processor further carries out a process of discarding the received packet when the sequence number indicated in the sequence information of the received packet is the same as or is arranged earlier in numerical order than the sequence number indicated in the sequence information of the packet received in advance from the at least one communication apparatus included in the communication apparatuses.

Supplementary Note 8

The communication system according to Supplementary note 6 or 7, wherein the determination information includes identification information indicating the transmission source communication apparatus connected to the terminal and sequence information indicating a sequence number of the transmission information, in the process of determining, the at least one processor carries out a process of comparing, for each transmission source communication apparatus, the sequence number of the received packet and the sequence number of the packet received in advance, and in the process of determining, when a comparison result obtained in the process of comparing indicates that (I) the sequence number indicated in the sequence information of the received packet is arranged later in numerical order than the sequence number indicated in the sequence information of the packet received in advance from the at least one communication apparatus included in the communication apparatuses, the at least one processor relays the received packet to the at least one communication apparatus in the communication apparatuses, and when the comparison result indicates that (II) the sequence number indicated in the sequence information of the received packet is the same as or is arranged earlier in numerical order than the sequence number indicated in the sequence information of the packet received in advance from the at least one communication apparatus included in the communication apparatuses, the at least one processor cuts off the relay.

Supplementary Note 9

The communication system according to any one of Supplementary notes 6 to 8, the at least one processor carries out a process of attaching, to the transmission information transmitted from a terminal connected to the communication apparatus in which the at least one processor is included, the identification information indicating the communication apparatus and the sequence information indicating the sequence number.

Supplementary Note 10

The communication system according to any one of Supplementary notes 6 to 9, wherein each of the packets includes receiving terminal information indicating a terminal to which the transmission information is intended to be delivered, and when a terminal to which the communication apparatus is connected is the terminal indicated in the receiving terminal information of the packet received by the communication section, the at least one processor carries out a switching process of removing the determination information from the and packet transmitting the transmission information included in the packet to the terminal.

Supplementary Note 11

A communication method using the communication apparatus according to any one of Supplementary notes 1 to 5, the method including:

receiving packets each including (i) transmission information f terminal, and (ii) determination information indicating a transmission source communication apparatus included in the communication apparatuses and connected to the terminal, and a transmission sequence;

using both the determination information of a received packet and the determination information of a packet received in advance from at least one communication apparatus included in the communication apparatuses, to determine whether or not to relay the received packet to at least one communication apparatus in the communication apparatuses; and transmitting the received packet to the at least one communication apparatus when the packet is relayed.

REFERENCE SIGNS LIST

1 Communication system
10, 10A, 10B, 10C, 10D Communication apparatuses
20 Communication section
30 Relay section
31 Determination section
33 Storage section
40 Switch section (attaching section)
100 First terminal
200 Second terminal (receiving terminal)
NE Mesh free space optical communication network
P Packet

The invention claimed is:

1. A communication apparatus included in a plurality of communication apparatuses capable of forming a mesh free space optical communication network, the apparatus comprising at least one processor, the at least one processor carrying out:

a communication process of transmitting and receiving packets each including (i) transmission information from a terminal, and (ii) determination information indicating a transmission source communication apparatus included in the communication apparatuses and connected to the terminal, and a transmission sequence; and a relay process of using both the determination information of a received packet and the determination information of a packet received in advance from at least one communication apparatus included in the communication apparatuses, to determine whether or not to relay the received packet to at least one communication apparatus in the communication apparatuses, in the communication process, the at least one processor transmitting the received packet determined to be relayed in the relay process to the at least one communication apparatus.

2. The communication apparatus according to claim 1, wherein the determination information includes identification information indicating the transmission source communication apparatus connected to the terminal and sequence information indicating a sequence number of the transmission information, and in the relay process, the at least one processor discards the received packet when the sequence number indicated in the sequence information of the received packet is the same as or is arranged earlier in numerical order than the sequence number indicated in the sequence information of the packet received in advance from the at least one communication apparatus included in the communication apparatuses.

3. The communication apparatus according to claim 1, wherein the determination information includes identification information indicating the transmission source communication apparatus connected to the terminal and sequence information indicating a sequence number of the transmission information, and in the relay process, the at least one processor carries out a determination process of comparing, for each transmission source communication apparatus, the sequence number of the received packet and the sequence number of the packet received in advance, and when a comparison result obtained in the determination process indicates that (I) the sequence number indicated in the sequence information of the received packet is arranged later in numerical order than the sequence number indicated in the sequence information of the packet received in advance from the at least one communication apparatus included in the communication apparatuses, the received packet is relayed to the at least one communication apparatus in the communication apparatuses, and when the comparison result indicates that (II) the sequence number indicated in the sequence information of the received packet is the same as or is arranged earlier in numerical order than the sequence number indicated in the sequence information of the packet received in advance from the at least one communication apparatus included in the communication apparatuses, the relay is cut off.

4. The communication apparatus according to claim 1, wherein to the communication apparatus, the terminal is connected, and the at least one processor carries out an attaching process of attaching, to the transmission information transmitted from the terminal, the identification information indicating the communication apparatus in which the at least one processor is included and the sequence information indicating the sequence number.

5. The communication apparatus according to claim 1, wherein each of the packets includes receiving terminal information indicating a terminal to which the transmission information is intended to be delivered, and when a terminal to which the communication apparatus is connected is the terminal indicated in the receiving terminal information of the packet received in the communication process, the at least one processor carries out a switching process of removing the determination information from the packet and transmitting the transmission information included in the packet to the terminal.

6. A communication method using the communication apparatus according to claim 1, the method comprising:

receiving packets each including (i) transmission information from a terminal, and (ii) determination information indicating a transmission source communication apparatus included in the communication apparatuses and connected to the terminal, and a transmission sequence;

using both the determination information of a received packet and the determination information of a packet received in advance from at least one communication apparatus included in the communication apparatuses, to determine whether or not to relay the received packet to at least one communication apparatus in the communication apparatuses; and transmitting the received packet to the at least one communication apparatus when the packet is relayed.

7. The communication apparatus method to claim 6, wherein the determination information includes identification information indicating the transmission source communication apparatus connected to the terminal and sequence information indicating a sequence number of the transmission information, and the determining includes discarding the received packet when the sequence number indicated in the sequence information of the received packet is the same as or is arranged earlier in numerical order than the sequence number indicated in the sequence information of the packet received in advance from the at least one communication apparatus included in the communication apparatuses.

8. The communication method according to claim 6, wherein the determination information includes identification information indicating the transmission source communication apparatus connected to the terminal and sequence information indicating a sequence number of the transmission information, and the determining includes:

comparing, for each transmission source communication apparatus, the sequence number of the received packet and the sequence number of the packet received in advance, and when a result of the comparison indicates that (I) the sequence number indicated in the sequence information of the received packet is arranged later in numerical order than the sequence number indicated in the sequence information of the packet received in advance from the at least one communication apparatus included in the communication apparatuses, relaying the received packet to the at least one communication apparatus in the communication apparatuses, and when the result indicates that (II) the sequence number indicated in the sequence information of the received packet is the same as or is arranged earlier in numerical order than the sequence number indicated in the sequence information of the packet received in advance from the at least one communication apparatus included in the communication apparatuses, cutting off the relay.

9. The communication method according to claim 6, wherein the terminal is connected to the communication apparatus, the method further comprising attaching, to the transmission information transmitted from the terminal, the identification information indicating the corresponding apparatus and the sequence information indicating the sequence number.

10. The communication method according to claim 6, wherein each of the packets includes receiving terminal information a terminal indicating to which the transmission information is intended to be delivered, the method further comprising, when a terminal to which the communication apparatus is connected is the terminal indicated in the receiving terminal information of the received packet, removing the determination information from the packet and transmitting the transmission information included in the packet to the terminal.

11. A communication system configured to carry out transmission and reception between terminals through a mesh free space optical communication network formed by a plurality of communication apparatuses, at least one communication apparatus included in the communication apparatuses comprising at least one processor, the at least one processor carrying out:

a communication process of transmitting and receiving packets each including (i) transmission information from a terminal, and (ii) determination information indicating a transmission source communication apparatus included in the communication apparatuses and connected to the terminal, and a transmission sequence; and a relay process of using both the determination information of a received packet and the determination information of a packet received in advance from at least one communication apparatus included in the communication apparatuses, to determine whether or not to relay the received packet to at least one communication apparatus in the communication apparatuses, in the communication process, the at least one processor transmitting the received packet determined to be relayed in the relay process to the at least one communication apparatus.

12. The communication system according to claim 11, wherein the determination information includes identification information indicating the transmission source communication apparatus connected to the terminal and sequence information indicating a sequence number of the transmission information, and in the relay process, the at least one processor discards the received packet when the sequence number indicated in the sequence information of the received packet is the same as or is arranged earlier in numerical order than the sequence number indicated in the sequence information of the packet received in advance from the at least one communication apparatus included in the communication apparatuses.

13. The communication system according to claim 11, wherein the determination information includes identification information indicating the transmission source communication apparatus connected to the terminal and sequence information indicating a sequence number of the transmission information, and the at least one processor in the relay process, carries out a determination process of comparing, for each transmission source communication apparatus, the sequence number of the received packet and the sequence number of the packet received in advance, and in the relay process, when a comparison result obtained in the determination process indicates that (I) the sequence number indicated in the sequence information of the received packet is arranged later in numerical order than the sequence number indicated in the sequence information of the packet received in advance from the at least one communication apparatus included in the communication apparatuses, the received packet is relayed to the at least one communication apparatus in the communication apparatuses, and when the comparison result indicates that (II) the sequence number indicated in the sequence information of the received packet is the same as or is arranged earlier in numerical order than the sequence number indicated in the sequence information of the packet received in advance from the at least one communication apparatus included in the communication apparatuses, the relay is cut off.

14. The communication system according to claim 11, wherein in the communication apparatus to which the terminal is connected, the at least one processor carries out an attaching process of attaching, to the transmission information transmitted from the terminal, the identification information indicating the communication apparatus in which the at least one processor is included and the sequence information indicating the sequence number.

15. The communication system according to claim 11, wherein each of the packets includes receiving terminal information indicating a terminal to which the transmission information is intended to be delivered, and when a terminal to which the communication apparatus is connected is the terminal indicated in the receiving terminal information of the packet received in the communication process, the at least one processor carries out a switching process of removing the determination information from the packet and transmitting the transmission information included in the packet to the terminal.

* * * * *